Nov. 27, 1956  F. M. GUY  2,772,126
SHAFT HANGER
Filed April 27, 1953  3 Sheets-Sheet 1
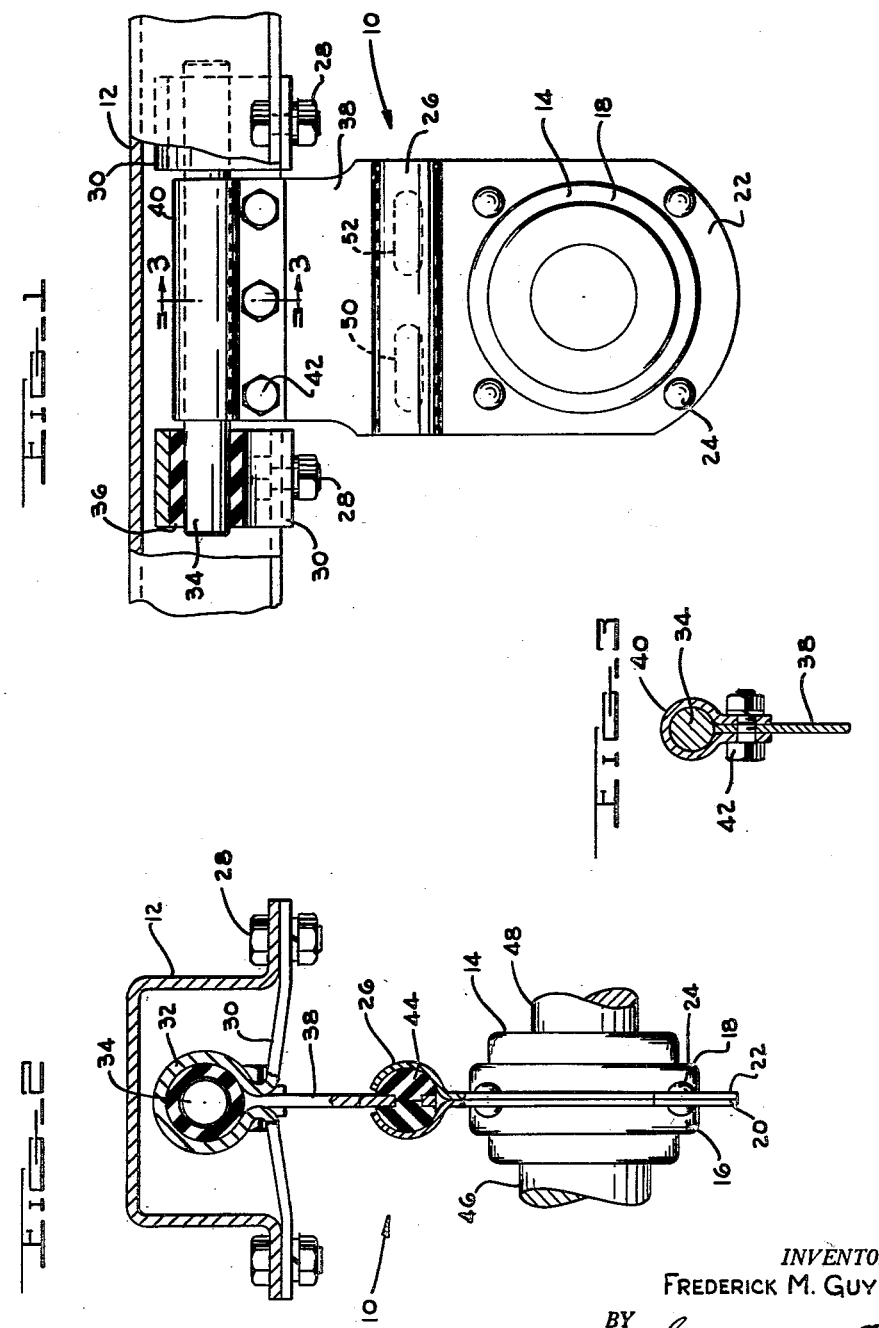
INVENTOR.
FREDERICK M. GUY
BY
*Smith and Olsen*
ATTORNEYS Nov. 27, 1956  F. M. GUY  2,772,126
SHAFT HANGER
Filed April 27, 1953  3 Sheets-Sheet 2
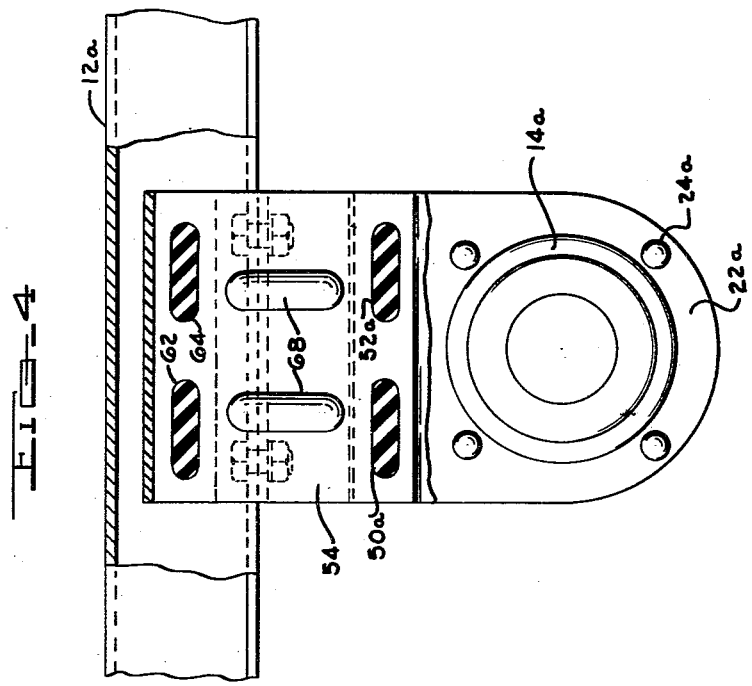
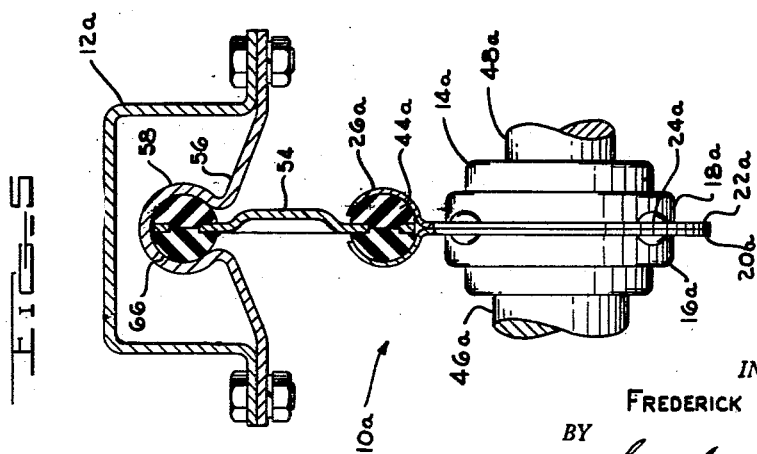
INVENTOR.
FREDERICK M. GUY
BY
Smith and Olem
ATTORNEYS Nov. 27, 1956 F. M. GUY 2,772,126
SHAFT HANGER
Filed April 27, 1953 3 Sheets-Sheet 3
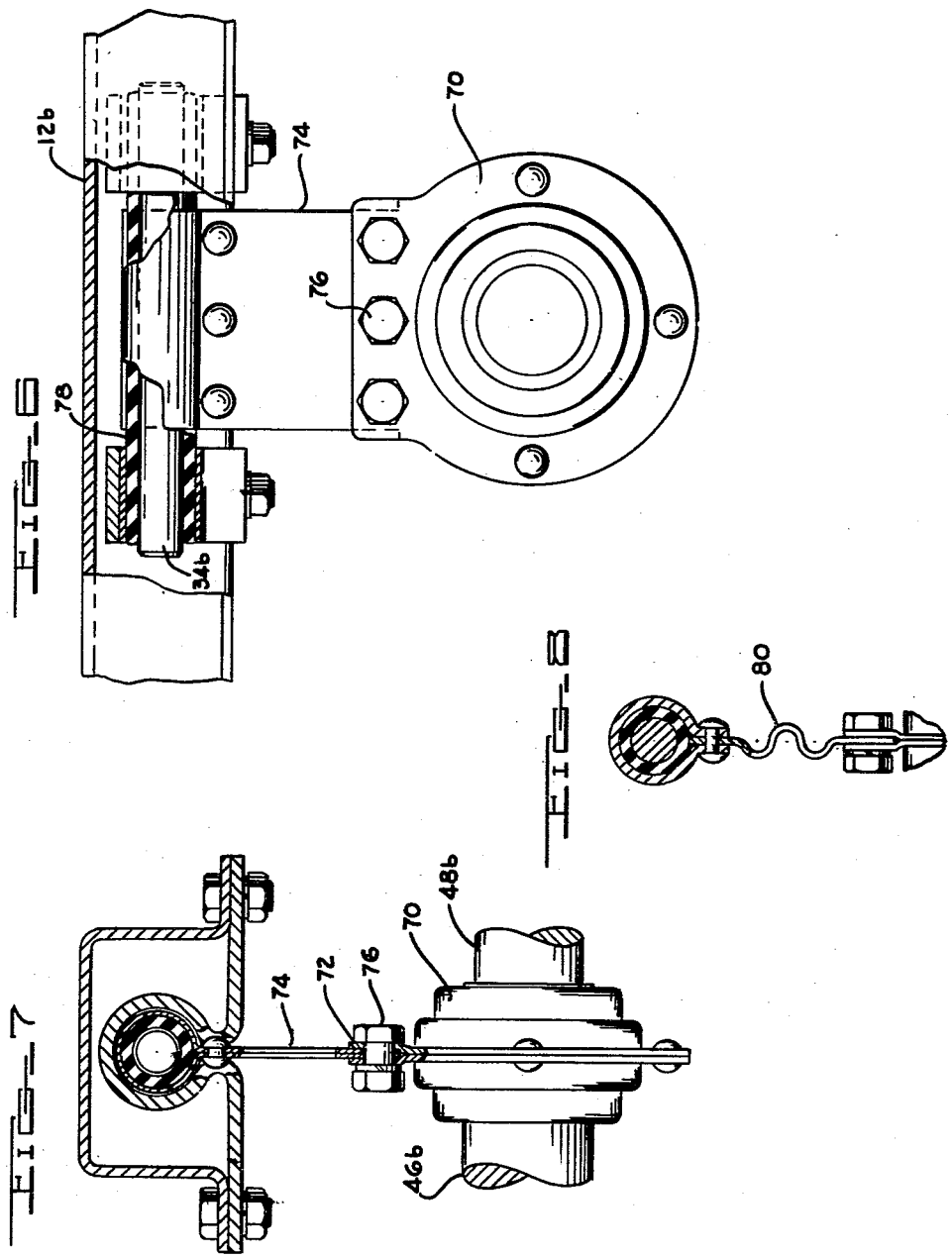
INVENTOR.
FREDERICK M. GUY
BY
Smith and Olsen
ATTORNEYS

United States Patent Office 2,772,126
Patented Nov. 27, 1956

2,772,126
SHAFT HANGER

Frederick M. Guy, Detroit, Mich., assignor to U. S. Universal Joints Company, a corporation of Michigan Application April 27, 1953, Serial No. 351,142

10 Claims. (Cl. 308—28)

The present invention relates to improved shaft hangers which are particularly but not exclusively adapted for use in a motor vehicle to provide a flexible support for a driven shaft or the like, which may be subjected to forces causing any of a variety of movements relative to a supporting member.

One of the important factors that must be considered when manufacturing shaft hangers for automotive use is the cost of initially manufacturing and thereafter installing the same. It must be borne in mind that the leading manufacturers of automobiles produce several million automobiles each year, and even small savings per shaft hanger amount to large savings when considered on an annual basis.

Accordingly, it is a principal object of the present invention to provide an improved resilient shaft hanger which is constructed and arranged to provide the optimum results when supporting a rotatable shaft so that limited movements of the shaft relative to a supporting surface may be had to accommodate various forces or thrusts that are imposed on either of the resiliently joined elements, such shaft hanger being characterized by its low manufacturing and installation cost.

It is another object of the present invention to provide a shaft hanger of the foregoing character which includes a housing for a shaft journaling bearing which is formed from two sheet metal stampings which may be interchangeable, if desired, and which has a simple but very effective construction and arrangement for attaching the housing to a depending hanger member.

It is still another object of the present invention to provide an improved resilient joint for resiliently connecting the aforesaid housing to the depending hanger member.

It is still another object of the present invention to provide a shaft hanger which has an improved support bracket adapted to resiliently support the depending hanger member, said support bracket being characterized by its simplicity and its adaptability for use in applying a preload on resilient bushings or joints joining the depending hanger member.

Still another object of the present invention is to provide a shaft hanger assembly for supporting a flexibly mounted rigid rotatable shaft and to permit its bodily movement relative to a supporting structure by means of resilient members which provide cushioning action as well as acoustic insulation.

Other objects of this invention will appear in the following description and appended claims, reference being had to the accompanying drawings forming a part of this specification wherein like reference characters designate corresponding parts in the several views.

In the drawings—

Figure 1 is a front elevation, partly in section, of a shaft hanger embodying the present invention;

Fig. 2 is a side elevation, partly in section, of the shaft hanger shown in Fig. 1;

Fig. 3 is a fragmentary section taken on the lines 3—3 of Fig. 1;

Fig. 4 is another embodiment of the present invention with portions being broken away;

Fig. 5 is a side elevation, partly in section of the embodiment shown in Fig. 4;

Fig. 6 is still another embodiment of the present invention with portions broken away;

Fig. 7 is a side elevation, partly in section, of the embodiment shown in Fig. 6; and Fig. 8 is a fragmentary side elevation showing a modification of the shaft hanger illustrated in Figs. 6 and 7.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the accompanying drawings, the illustrated shaft hangers embodying the present invention are particularly well adapted for use with motor vehicles in the manner suggested in my prior Patent No. 2,450,279, issued September 28, 1948.

Referring now to the drawings, and first to the shaft hanger 10 embodied in Figs. 1 to 3, a supporting structure 12 can be seen from which the shaft hanger 10 is suspended. The latter includes a housing 14 within which is a shaft journaling bearing, not shown. Housing 14 comprises two sheet metal stampings 16 and 18 which have abutting flanges 20 and 22 held together by a plurality of rivets 24, and the upper portion of said flanges 20 and 22 are flared apart to form a pair of jaws or gripping members 26, the purpose of which will be more fully explained hereinafter.

Secured to the supporting structure 12 by a plurality of bolts 28 are supporting brackets 30, each being formed from a single strip of metal and having an upwardly extending loop 32 formed therein so that when the ends of each bracket are pulled apart or pushed together the loop portion will act as jaws or gripping members.

A rod 34 extends through the loops 32 and carries resilient bushings 36 which are held in the loop jaws in a preloaded condition. Secured to the midportion of rod 34 is a depending hanger or web member 38 which has its upper end secured to the rod 34 by means of the strap 40 and bolts 42.

The lower end of the web member 38 has a cylindrical member 44 made from rubber or other suitable material extending along its lower edge which is firmly gripped by the jaws 26 of housing 14 to form a very effective resilient joint for cushioning movements of the shafts 46 and 48 relative to supporting structure 12. It also prevents metal to metal contact between the housing 14 and web member 38, in much the same manner as the bushings 36 prevent metal to metal contact between the upper end of the web member 38 and the support brackets 30.

One suitable arrangement for mounting the cylindrical member 44 between the web member 38 and jaws 26 is shown in the drawings, but it should be understood that other suitable fastening arrangements can be used without deviating from the scope of the present invention. In the present arrangement the cylindrical member 44 is formed in two halves having protuberances extending into the apertures 50 and 52 in the lower end of web member 38, and the halves are held in place by the clamping action of the jaws 26.

The modification shown in Figs. 4 and 5 has many of the same features as the shaft hanger described above and shown in Figs. 1 to 3, and the same reference numbers followed by the letter a are used to designate similar parts.

The principal difference in the embodiments is the manner in which the upper end of the web member 54 is resiliently suspended from the supporting structure 12. The support bracket 56 extends the full width of the web member 54 and has jaws 58 similar to those formed in the previously described support brackets 30. The upper end of the web member 54 is slotted at 62 and 64 so that the cylindrical member 66 will be retained in place by the clamping action of jaws 58 in the same manner as at the lower end of the web member 54. It will also be noted that the web member 54 which is made of a suitable sheet metal has elongated vertical embossments 68 formed in its surface for rigidifying itself. It is to be understood that this feature may be used with any of the embodiments shown, if desired.

The embodiment shown in Figs. 4 and 5 is especially well adapted for rapid assembly on a production line and has a minimum number of simple, standard parts which materially contribute to produce a low cost item. Furthermore, the rubber-like cylindrical members 44a and 66 are very effective for giving the best results for cushioning vibrations or sounds which might otherwise be transmitted from the shafts to the support structure 12a or vice versa.

The embodiment shown in Figs. 6 and 7 has a flared portion at the upper end of the housing 70 which forms jaws 72 which are clamped to the web member 74 by a plurality of bolts 76. In other respects this housing 70 has the same construction as the previously described housings 14 and 14a and has the same desirable features.

The upper end of the web member 74 is attached to the rod 34b in much the same manner as in the embodiment illustrated in Figs. 1 to 3. However, in the present construction a single rubber bushing 78 extends the full length of rod 34b providing additional resilient cushioning between the upper end of web member 74 and the supporting structure 12b to compensate for the elimination of the rubber cushioning members at the lower end of the web member 74.

In this embodiment the web member 74 may have horizontal corrugations 80 extending across its width, if desired, to permit the shaft hanger to accommodate more readily axial thrusts that are applied to the shafts 46b and 48b.

From the foregoing it can be seen that the present invention provides simple shaft hangers which have standard, light-weight parts which can be economically manufactured and installed. The shaft hangers are also constructed and arranged to be especially well suited to accommodate movements of the supported shafts relative to the supporting member and they have resilient joints which are exceptionally well suited to cushion vibrations which might be transmitted through the shaft hangers to the supporting structure or vice versa.

Having thus described my invention, I claim:

1. In a resilient shaft hanger, the combination of a housing formed from two vertically disposed sheet metal stampings secured together for receiving a shaft journaling bearing, the upper portions of said stampings having straight horizontal concave channels facing one another so that when said stampings are secured together straight horizontal jaws are formed which are partially open on their upper ends, a depending hanger member extending through the partial opening in the jaws, said hanger member including a rubber-like element carried by its lower end portion and clamped by said jaws in a preloaded condition.

2. In a resilient shaft hanger for supporting a substantially horizontal shaft, the combination of a vertically arranged bearing housing having a pair of straight horizontal upwardly opening jaws along its upper side, and a depending hanger member carrying a straight resilient rubber-like member along its lower edge, said jaws being clamped over said rubber-like member so as to provide a hinge-like resilient joint between the housing and the hanger member.

3. In a resilient shaft hanger for supporting a substantially horizontal shaft, the combination of a vertically arranged bearing housing having a pair of straight horizontal upwardly opening jaws along its upper side, a depending hanger member carrying a straight resilient rubber-like member along its lower edge, said jaws being clamped over said rubber-like member so as to provide a hinge-like resilient joint between the housing and the hanger member, and a straight resilient joint at the upper end of said hanger member for connecting the same by a flexible hinge-like joint to a supporting surface.

4. In a resilient shaft hanger for supporting a substantially horizontal shaft, the combination of a vertically arranged bearing housing having a pair of straight horizontal concave jaws along its upper side, and a depending hanger member carrying a straight cylindrical resilient rubber-like member along its lower edge, said hanger member being formed from sheet metal and having at least one vertical embossment to rigidify the same, and said jaws being clamped over said rubber-like member so as to provide a straight resilient joint between the housing and the hanger member.

5. In a resilient shaft hanger for supporting a substantially horizontal shaft, the combination of a vertically arranged bearing housing having attaching means along its upper side, a depending hanger member having its lower edge joined to said attaching means and having a cylindrical rubber-like member extending horizontally along its upper edge, and a one piece support bracket clamped around said rubber-like member to provide a resilient joint between the bracket and the hanger member, said support bracket being an inverted U-shaped member with the ends first converging toward one another to form a circular clamp around the cylindrical rubber-like member and thereafter diverging so that the free ends can be attached to a supporting surface.

6. In a resilient shaft hanger for supporting a substantially horizontal shaft, the combination of a vertically arranged bearing housing having a pair of horizontally disposed upwardly opening jaws of cylindrical shape, a support bracket having a pair of horizontally disposed downwardly opening jaws of cylindrical shape, and a rigid web member extending between said pairs of jaws, said web member having cylindrical rubber-like members across its upper and lower edges which are held by said pairs of jaws to provide resilient joints.

7. The combination claimed in claim 6 wherein said web member is formed from sheet metal and has at least one vertical embossment to rigidify the same.

8. In a resilient shaft hanger for supporting a substantially horizontal shaft, the combination of a vertically arranged bearing housing having attaching means along its upper side, support brackets adapted to be secured to a supporting surface, each bracket being formed from a single strip of metal and having downwardly opening jaws, a depending hanger member having its lower edge joined to said attaching means and having stub shafts extending laterally from its upper portion into the jaws of said brackets, and resilient bushings carried on said shafts and held in preloaded condition.

9. In a resilient shaft hanger for supporting a substantially horizontal shaft, the combination of a vertically arranged bearing housing having a pair of upwardly opening jaws, support brackets adapted to be secured to a supporting surface, each bracket being formed from a single strip of metal and having downwardly opening jaws, a web member extending between said upwardly and downwardly opening jaws, said web member having a rubber-like member across its lower edge which is clamped by the first named jaws and having shaft portions extending laterally from its upper edge into the second named jaws, and resilient bushings carried on said shaft portions and held by the second named jaws.

10. In a resilient shaft hanger for supporting a substantially horizontal shaft, the combination of a vertically arranged bearing housing having attaching means along its upper side, supporting means adapted to be secured to a supporting surface, and a depending hanger member attached to said supporting means and said attaching means, the hanger member being formed from a sheet of spring steel and having horizontally disposed corrugations.

References Cited in the file of this patent

UNITED STATES PATENTS

| Number | Name | Date |
|---|---|---|
| 1,063,797 | Hope | June 3, 1913 |
| 1,320,045 | Hallowell | Oct. 28, 1919 |
| 1,836,772 | Rossman | Dec. 15, 1931 |
| 1,871,116 | Cummings | Aug. 9, 1932 |
| 2,070,081 | Henry | Feb. 9, 1937 |
| 2,661,985 | Guy et al. | Dec. 8, 1953 |